United States Patent
Roba et al.

(10) Patent No.: US 7,587,914 B2
(45) Date of Patent: Sep. 15, 2009

(54) BURNER FOR MANUFACTURING A GLASS OPTICAL FIBRE PREFORM BY VAPOUR DEPOSITION

(75) Inventors: Giacomo Stefano Roba, Monza (IT); Franco Veronelli, Lainate (IT); Massimo Nutini, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 605 days.

(21) Appl. No.: 10/478,835

(22) PCT Filed: May 27, 2002

(86) PCT No.: PCT/EP02/05790

§ 371 (c)(1), (2), (4) Date: Aug. 31, 2004

(87) PCT Pub. No.: WO02/098805

PCT Pub. Date: Dec. 12, 2002

(65) Prior Publication Data

US 2004/0261460 A1 Dec. 30, 2004

Related U.S. Application Data

(60) Provisional application No. 60/295,591, filed on Jun. 5, 2001.

(30) Foreign Application Priority Data

May 30, 2001 (EP) .................................. 01113225

(51) Int. Cl.
*C03B 37/018* (2006.01)
(52) U.S. Cl. ........................................... 65/531; 65/413

(58) Field of Classification Search .................... 65/413, 65/530, 531
See application file for complete search history.

(56) References Cited

U.S. PATENT DOCUMENTS 2,921,542 A * 1/1960 Kidwell et al. ............... 110/265

(Continued)

FOREIGN PATENT DOCUMENTS

EP 1 016 635 A1 7/2000

(Continued)

OTHER PUBLICATIONS

Incropera, F. et al., "Introduction to Heat Transfer", John Wiley & Sons, 3$^{rd}$ Edition, N.Y., pp. 50 and 757-761, (1996).

(Continued)

*Primary Examiner*—Steven P Griffin
*Assistant Examiner*—Queenie Dehghan
(74) *Attorney, Agent, or Firm*—Finnegan, Henderson, Farabow, Garrett & Dunner, L.L.P.

(57) ABSTRACT

A method for feeding a flow of gas to a burner for manufacturing an optical fiber preform. The burner has a plurality of coaxial tubes, each two adjacent coaxial tubes defining an annular channel between themselves; an annular gas distribution chamber at one extremity of the annular channels and in fluid communication therewith, the annular distribution chamber being delimited in the radial direction by an inner and an outer surface. The flow of gas is introduced into the distribution chamber so that the direction of its radially outermost portion is tangential to the radially outer surface of the distribution chamber. The method allows obtaining a better gas velocity distribution in the annular channels.

4 Claims, 5 Drawing Sheets

U.S. PATENT DOCUMENTS

| | | | |
|---|---|---|---|
| 4,417,692 A | | 11/1983 | Andrejco et al. |
| 4,551,609 A | * | 11/1985 | Falk .................. 219/121.52 |
| 4,661,140 A | | 4/1987 | Takimoto et al. |
| 5,043,002 A | | 8/1991 | Dobbins et al. |
| 5,513,801 A | * | 5/1996 | Huhne et al. ............. 239/419.3 |

FOREIGN PATENT DOCUMENTS

| | | |
|---|---|---|
| EP | 1 216 967 A1 | 6/2002 |
| GB | 2 346 683 A | 8/2000 |
| JP | 3-69527 | 3/1991 |
| JP | 7-144927 | 6/1995 |
| WO | WO 82/03345 | 10/1982 |
| WO | WO 02/49975 A1 | 6/2002 |
| WO | WO 02/49976 A1 | 6/2002 |

OTHER PUBLICATIONS

Bird, R. B. et al., "Transport Phenomena", John Wiley & Sons, N.Y., pp. 246-247, (1960).

* cited by examiner

BURNER FOR MANUFACTURING A GLASS OPTICAL FIBRE PREFORM BY VAPOUR DEPOSITION

CROSS REFERENCE TO RELATED APPLICATIONS

This application is a national phase application based on PCT/EP02/05790, filed May 27, 2002, the content of which is incorporated herein by reference, and claims the priority of European Patent Application No. 01113225.5, filed May 30, 2001, the content of which is incorporated herein by reference, and claims the benefit of U.S. Provisional Application No. 60/295,591, filed Jun. 5, 2001, the content of which is incorporated herein by reference.

FIELD OF THE INVENTION

The present invention relates to a method for feeding a flow of gas to a burner for manufacturing an optical fibre preform used to make optical glass fibres and to a burner for manufacturing said optical fibre preform.

In particular, the present invention relates to a method for feeding a flow of gas to a burner for manufacturing an optical fibre preform, said burner comprising a plurality of coaxial channels, in a manner that allows to achieve a better gas velocity distribution in said channels and to a burner for performing said method.

BACKGROUND ART

Glass fibres for optical communication are made from high purity, silica-based glass fibres drawn from glass preforms, which preforms are produced according to various glass deposition techniques.

Some of these deposition techniques, including vapour axial deposition (VAD) and outside vapour deposition (OVD), are based on flame combustion wherein reactants (i.e. silica precursors, such as $SiCl_4$, optionally together with dopants materials, such as $GeCl_4$, for suitably modifying the refractive index of the glass) are fed together with combusting gases through a deposition burner which directs a high temperature flow of forming fine glass particles onto a rotating growing target preform.

According to the VAD deposition technique, the growth of the preform takes place in an axial direction. Thus, the deposition burner(s) is typically maintained in a substantially fixed position, while the rotating preform is slowly moved upwardly (or downwardly) with respect to the burner, in order to cause the axial growth of the preform. Alternatively, the rotating preform can be maintained in a substantially fixed position, while the deposition burner is slowly moved downwardly (or upwardly) with respect to the preform.

Differently from the VAD technique, in the OVD technique the growth of the preform takes place in a radial direction. In this case, a rotating target (e.g. a quartz glass rod) is generally positioned in a fixed horizontal or vertical position and the deposition burner is repeatedly passed along the surface of the growing preform for causing the radial growth of the same.

Independently from the applied deposition technique, a porous glass preform is thus fabricated, which is then consolidated to form a solid glass preform apt for being subsequently drawn into an optical fibre.

Typically, an optical fibre preform comprises a central portion (core) and an outer portion (cladding), the core and the cladding differing in their respective chemical composition and having thus different refractive indexes. As in the optical fibres, the cladding portion forms the majority of the preform. The preform is typically manufactured by producing and consolidating a first preform comprising the core and a first portion of the cladding. An overcladding layer is then deposited onto said first preform, thus obtaining a porous preform, which is then consolidated into the final preform.

In general, conventional burners for manufacturing optical fibre preforms are made up of a plurality of coaxial tubes through which the glass precursor materials (i.e. silica precursors, such as $SiCl_4$, optionally together with dopants materials, such as $GeCl_4$), the combusting gases (e.g. oxygen and hydrogen or methane) and, optionally, some inert gas (e.g. argon or helium) are fed. Typically, the glass precursor material is fed through the central tube of the burner, while other gases are fed through the annular channels defined by the coaxially disposed tubes.

Generally, the gases are introduced at one extremity of each annular channel.

U.S. Pat. No. 4,417,692 describes a burner for manufacturing an optical fibre preform comprising a plurality of coaxial tubes defining a plurality of annular channels between each pair of adjacent tubes, having an annular chamber at the extremity of each annular channel. The chambers are radially delimited by two cylindrical concentric surfaces. A feeding duct is connected to each chamber to feed a gas into it. The feeding ducts are disposed perpendicularly to the axis of the coaxial tubes; their direction thus intersects the inner surface delimiting the annular chambers.

U.S. Pat. No. 4,661,140 describes a burner for manufacturing an optical fibre preform comprising a plurality of coaxial tubes defining a plurality of annular channels between each pair of adjacent tubes. The gas is fed into the annular channels directly by means of pipes disposed perpendicularly to the axis of the coaxial tubes. Also in this case, the direction of said pipes intersects the inner surface delimiting said annular channels.

The Applicant has however observed that the disposition, of said feeding ducts or pipes may not allow a completely satisfactory uniform distribution of the gas flowing through the annular channels of the burners. For possibly optimising the gas distribution along the circumference of said channels, the Applicant has now found a new method for feeding the gases into distribution chambers that are connected to said annular channels and a burner for implementing the said method. It has in fact been found that by imparting to the flow of gas fed to the distribution chambers a direction not incident to the axis of the coaxial tubes, in particular a direction substantially tangential to the inner surface of the distribution chamber the problem can be overcome.

Advantageously, an optimised distribution of gases according to the present invention may allow using deposition burners having shorter lengths. As a matter of fact, in the burners of the prior art, a substantial length of the tubes forming the annular channels is necessary, in order to allow the flow of gas to reach a substantial uniformity before exiting from said annular channels. According to the present invention, a substantially uniform flow of gas is instead obtained within a relatively short distance from the entrance of said gas into the annular channels. Consequently, the length of the tubes forming the annular channels can be advantageously reduced, if desired.

SUMMARY OF THE INVENTION

The Applicant has now developed a method for feeding a flow of gas into a burner for manufacturing an optical fibre preform, said burner comprising:

a plurality of coaxial tubes, each two adjacent coaxial tubes defining an annular channel therebetween;

an annular gas distribution chamber at one extremity of at least one of said annular channels and in fluid communication therewith, said annular distribution chamber being delimited in the radial direction by an inner and an outer surface; and a feeding duct to feed a flow of gas into said distribution chamber, said method comprising the step of introducing the gas into said distribution chamber with a direction not intersecting the axis of said coaxial tubes and lying on a plane intersecting said axis.

According to a preferred embodiment, said gas has a direction lying on a plane perpendicular to the axis of said coaxial tubes.

It is preferred that said flow of gas entering the distribution chamber has a direction not intersecting the inner surface of the distribution chamber. More preferably, the direction of the radially outermost portion of the flow of gas entering said distribution chamber is substantially tangential to the radially outer surface thereof. The term "radially" is always referred to the radial distances as measured from the axis of the coaxial tubes.

After having been fed to the distribution chamber, the gas leaves said distribution chamber and is introduced into the annular channel with which the distribution chamber is in fluid communication. It is preferred that a direction substantially parallel to the axis of the coaxial tubes is conferred to the gas flowing along said annular channel. According to a preferred embodiment, this can be achieved by passing the gas through a layer of porous material. Said layer may be advantageously placed transversally to the gas flow in the said channel, or, preferably, at the entrance of the channel. More preferably, the layer is placed between the distribution chamber and the annular channel.

According to another aspect, the present invention relates to a burner for manufacturing an optical fibre preform said burner comprising:

a plurality of coaxial tubes, each two adjacent coaxial tubes defining an annular channel between themselves a gas distribution chamber at one extremity of at least one of said annular channels and a device for feeding a gas into said distribution chamber, wherein said device imparts to the flow of said gas entering the distribution chamber a direction not intersecting the axis of said coaxial tubes and lying on a plane transversal thereto.

According to a preferred embodiment, the device comprises a feeding duct connected to said distribution chamber, said feeding duct being disposed in a direction substantially tangential with respect to the inner surface of the distribution chamber said inner surface being as above defined.

A layer of porous material is advantageously placed at the inlet section of the annular channel.

Preferably, the coaxial tubes have a circular cross-section. However, they may also have cross-sections of other shape, such as an elliptical cross-section. The section of the distribution chamber on a plane perpendicular to the axis of the coaxial tubes has preferably the same shape of the cross-section of said annular channels.

According to an embodiment of the invention, the lower extremities of two adjacent coaxial tubes defining an annular channel lie on different planes in particular, the innermost of the two tubes has a portion extending below the outermost one; a portion of the outer surface of the inner tube outside the annular channel may thus constitute the inner surface of the distribution chamber.

A further aspect of the present invention relates to a method for manufacturing an optical fibre preform by directing a flow of fine glass particles from a deposition burner comprising a plurality of channels onto a rotating elongated target preform by using a deposition burner as above described.

The coaxial tubes can be made of any suitable material, such as metallic materials or quartz glass. Preferred are metallic materials, stainless steel being more preferred.

The porous material layer may be made of a porous metallic material.

DESCRIPTION OF THE PREFERRED EMBODIMENTS

Figure 1:
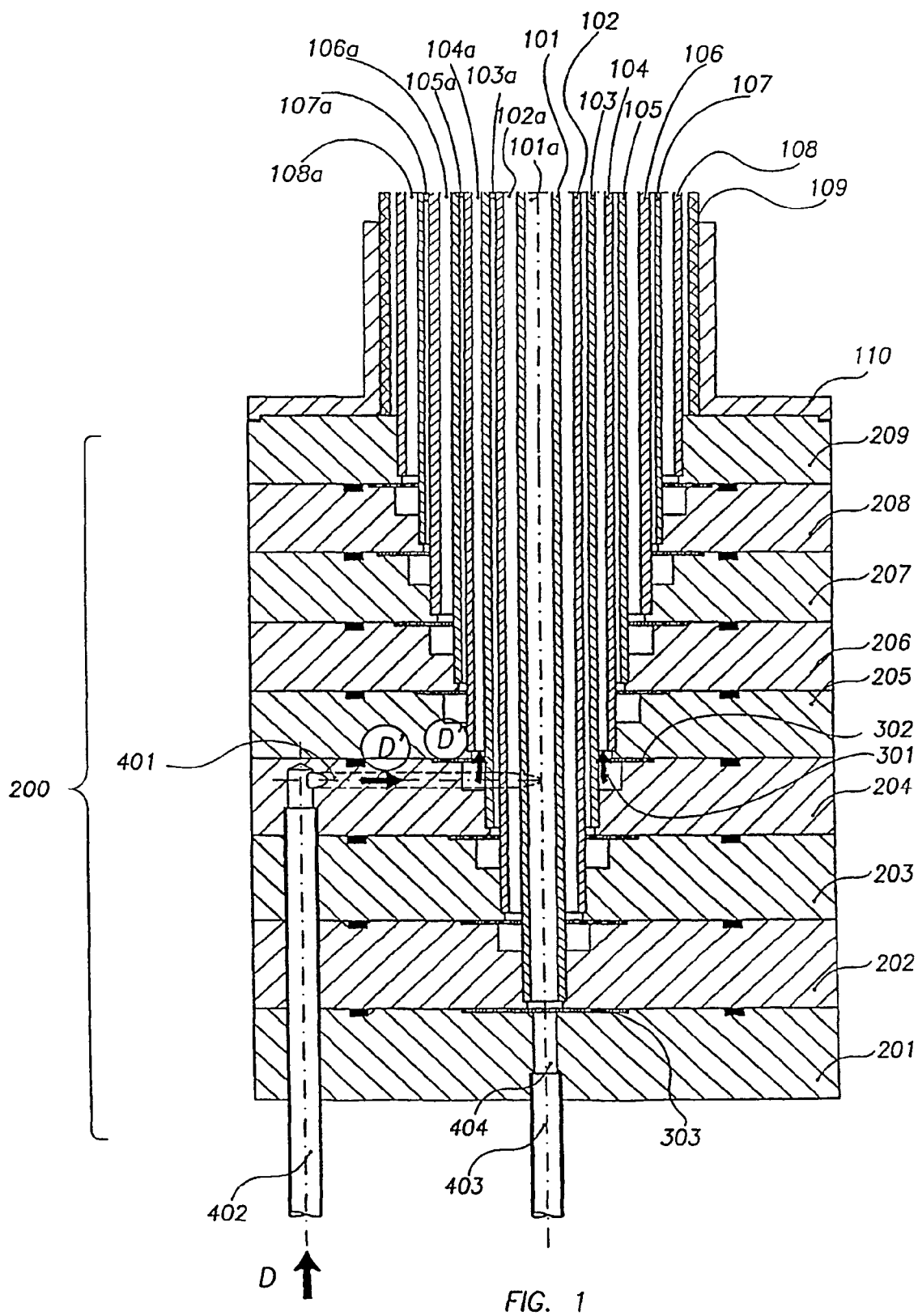
FIG. 1 shows a schematic longitudinal sectional view of a part of a burner according to the present invention.

FIG. 1 shows schematically a longitudinal section of a burner according to one embodiment of the invention.

The burner comprises a metallic body 200 containing the lower extremities of eight coaxial tubes, indicated with references 101 to 108, and the distribution chambers 204 (only one of said chambers being numerically identified). The tubes 101 to 108 constitute the terminal part of the burner itself and end in eight circular orifices placed at their extremities opposite to those contained in the body 200. From those extremities, the process gases are discharged and are then made to react in a flame.

Eight pipes, of which only two (402, 403) are shown in the figure, are used to feed the process gases to the burner.

According to a further embodiment, the body 200 of the burner comprises nine superimposed metallic cylindrical members 201-209.

Each of the tubes 101 to 108 is welded or otherwise firmly connected to one of the cylindrical members 201-209 in a corresponding seat. An annular channel is defined between each pair of said tubes; the annular channels are indicated with ref. 102a-108a.

Figure 2:
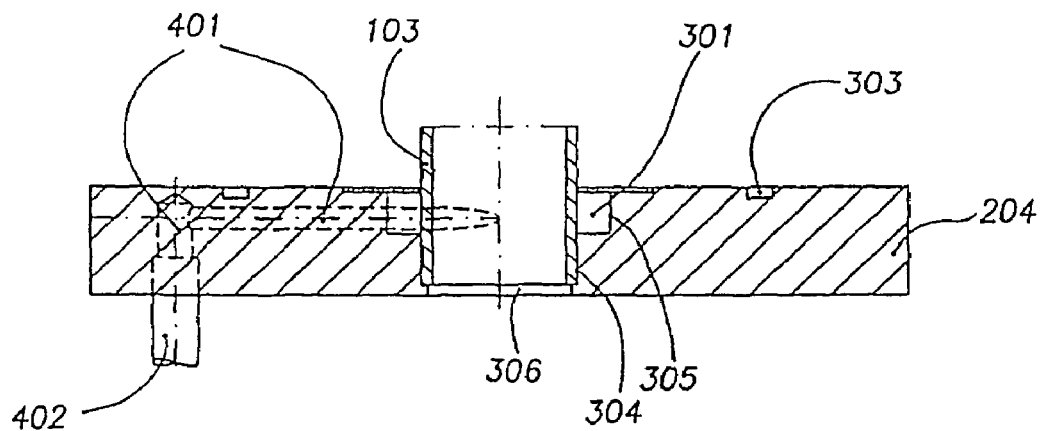
FIGS. 2 and 3 respectively show a lateral sectional view and a top view of a cylindrical member constituting part of the burner, as will be later described, bearing a distribution chamber.
Figure 3:
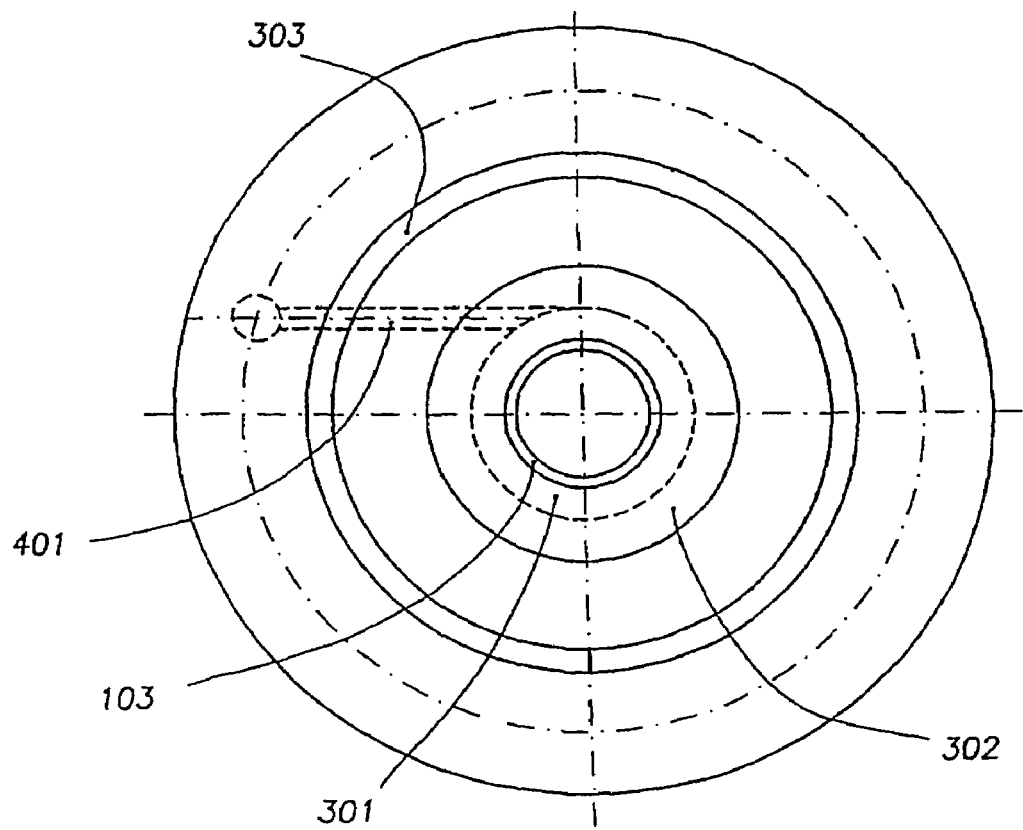

In FIGS. 2 and 3 an enlarged longitudinal section and a top view of a cylindrical member, indicated in FIG. 1 with ref. 204, is given. The cylindrical member 204, specifically the fourth from the bottom end of the body 200 of the burner, is shown when dismantled from the burner and the extremity of the tube 103 connected with said member 204 is also shown.

The member 204 presents a central bore 306, perforating it from part to part, coaxial with member 204. Coaxial with the member is also a seat 304 made to receive the extremity of the tube 103 connected with member 204. The bore 306 and the seat 304 may be obtained for example by boring.

In the cylindrical member, an annular distribution chamber 301 is also obtained. It can be appreciated from FIG. 2 that the chamber 301 is delimited radially outwardly and downwardly by surfaces obtained in the cylindrical member 204, for example by boring. Radially inwardly, the chamber 301 is delimited by the outer wall of the tube 103 when the latter is inserted into its seat 304. Upwardly it is delimited by a layer of porous material 302, inserted in a seat expressly obtained in the cylindrical member 204. The porous material layer can suitably have the form of a disk bearing a central bore to externally fit the tube 103.

Suitable porous materials include multi-layered sintered metal fibres, manufactured of stainless steel, and are commercially available with a porosity ranging from 68% to 83%. An example of porous material layer, which can be advantageously used, is porous filters FIBERMET AO Series, by MEMTEC, composed by metal fibres and having a porosity of 78.4%.

A seat 303 is also obtained in the cylindrical member 204 for receiving a sealing means, for example an O-ring or a gasket.

A duct 401 is provided to connect a gas-feeding pipe 402 to the distribution chamber 301. The end part of said duct enters the chamber 301 tangentially with respect to the inner surface of the chamber, as can be appreciated from FIG. 3. An extremity of pipe 402 enters a seat obtained in the cylindrical member 204, with which it is welded or otherwise gas-tightly connected.

Referring again to FIG. 1, cylindrical members 202, 203 and 201 are perforated so to provide an opening through the body 200 of the burner through which the pipe 402 passes.

Alternatively, the superposed openings through body 200 may themselves define a passage for the gas, in connection with the duct 401; sealing means should then be provided between each two adjacent cylindrical members passed through by said passage, to make it gas-tight.

The distribution chamber 301 is in connection through the porous material layer 302 with the annular channel 104a, defined between the tubes 103 and 104.

All the cylindrical members 201-209 have a structure similar to that above-described of member 204, except the uppermost and the lowermost members 201 and 209. They all present distribution chambers, ducts (analogue to the duct 401 of member 204) for connecting the distribution chambers with a gas feeding pipe (analogue to pipe 402); those structure are not shown in FIG. 1 in order to preserve the readability of the drawing.

Figure 4:
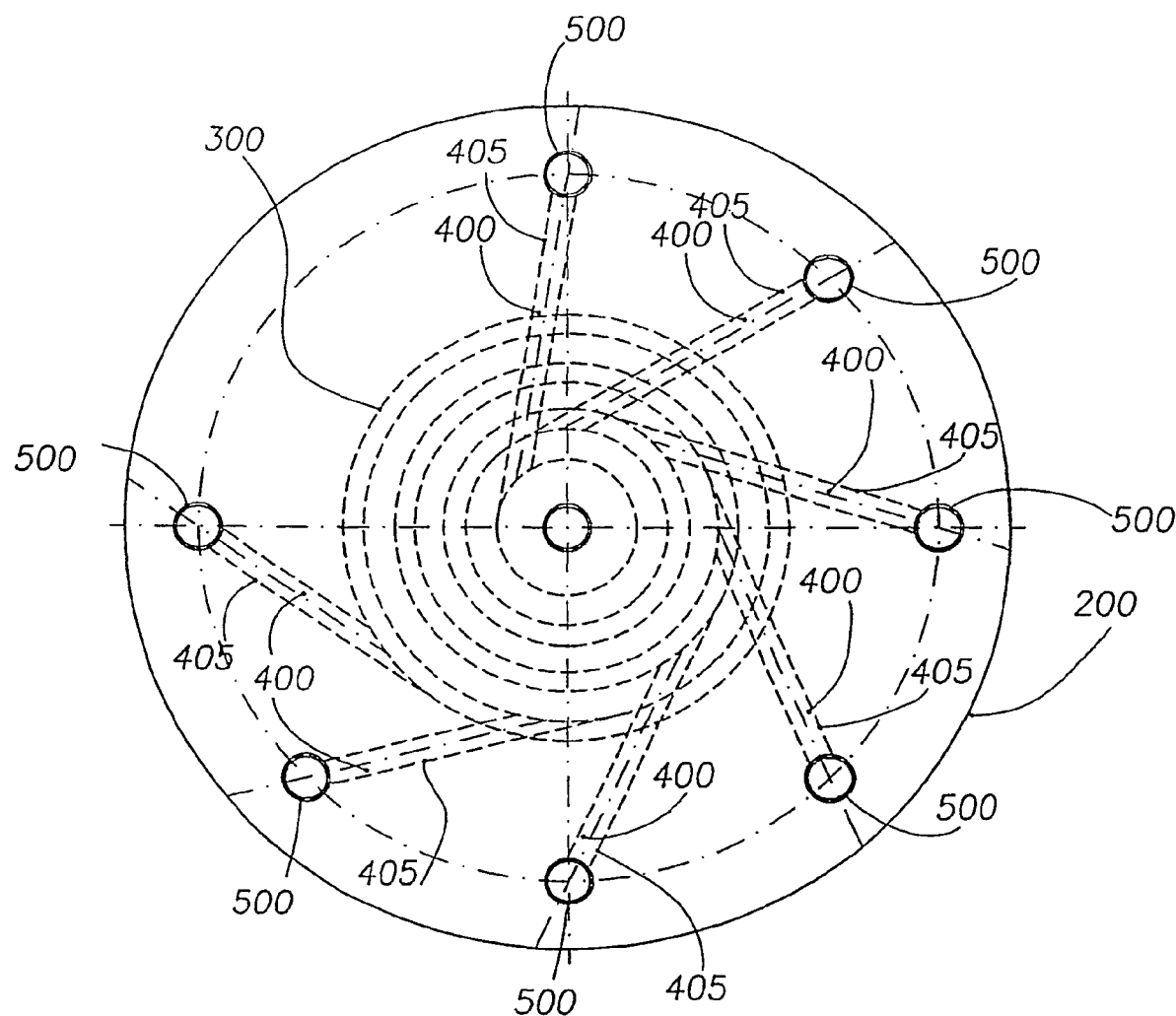
FIG. 4 shows a bottom view of a part of a burner according to the present invention.

FIG. 4 presents a bottom view of the body 200 of a burner according to the present invention, where the coaxial tubes, the porous material layers and the seats for containing the annular gaskets do not appear. More precisely, in this view every unnecessary particular has been omitted, in order to have a clearer vision. From that view, a suitable disposition of the said ducts (collectively indicated with ref. 400) for connecting the distribution chambers with the said gas-feeding pipes (collectively indicated with ref. 500) can be evinced, as well as the inlet of said ducts 400 into the distribution chambers (only the radially outer surface 300 of said chambers is shown in this figure). It can be seen how the outer portion 405 of the ducts 400 at their entrance into the distribution chambers, is, according to a preferred embodiment, tangential to the outer surface 305 of said chambers. Any other suitable disposition of ducts and pipes can be applied.

The members 201-209 are assembled together as shown in FIG. 1 for example by means of screws (not shown in FIGS. 1 to 3), which pass through the whole body 200 through suitably obtained holes (not shown in FIGS. 1 to 3). Pins or other suitable means (not shown in FIGS. 1 to 3) are advantageously employed, according to the knowledge of the skilled in the art, to assure the precise relative positioning of said members 201-209, when they are assembled.

All the disks, except top disk 209, have an annular gasket, placed in a seat analogue to the seat 303 of the member 204, to create a gas tight connection with the adjacent disk.

According to a preferred embodiment, all the gas-feeding pipes, analogue to pipe 402, pass through the members placed below the member to whose distribution chamber they are connected. The pipes for feeding gas to the members above member 204, as well as the holes that permit them to pass trough member 204, are not shown in FIGS. 1 to 3.

The lowermost member 201 presents a bore 404 connecting gas-feeding pipe 403 to channel 101a, which is the opening of the central tube 101. A disk 302 of porous material can also be placed across that connection.

According to an embodiment of the invention, a tube 109, made from heat resistant material, can be disposed externally to the outer tube 108, extending for a certain length farther from the tip of said tube 108, for confining the flame. Preferably, the tube 109 extends for about 150 mm to about 220 mm from the tips of the outer metal tube 108. A suitably shaped part 110 provides a seat for said tube 109; said part 110 can be advantageously shaped as a flanged portion of tube, as shown in FIG. 1.

The heat resistant material of tube 109 is for instance quartz glass or ceramic material, such as alumina. Preferably, quartz, in particular high purity quartz, is employed.

According to the method to which the present invention relates, and with reference to FIG. 1, a gas is fed through pipe 402 and duct 401 to the distribution chamber 301 of member 204, following the path indicted by arrows D and D'. As can be appreciated from FIG. 3, the gas enters the distribution chamber 301 so that its radially outermost portion has a direction substantially tangential to the radially outer surface 305 delimiting said chamber 301. The gas then flows through layer 302 to the annular channel 104a, as shown by arrows D", with a direction substantially parallel to the longitudinal axis of the burner. The gas to be flown through the other annular channels is fed in an analogue way. The gas for the central channel 101a preferably fed through an axial pipe 403.

As observed by the applicant, the above described optimised distribution of the gas results in a substantially uniform axial flow of gas, achievable in a relatively short length of the annular channels, thus allowing to reduce the length of the tubes forming the burner, when desirable.

It is preferred that the coaxial tubes are made from a metallic material, more preferably from an easily machinable and heat/corrosion resistant stainless steel. An example of a suitable metal material is AISI (American Institute Steel and Iron) 316L, which is a stainless steel comprising about 0.03% C about 16-18% of Cr, about 11.5%-14.5% of Ni, about 2% of Mn and about 2.5%-3% of Mo.

Figure 5:
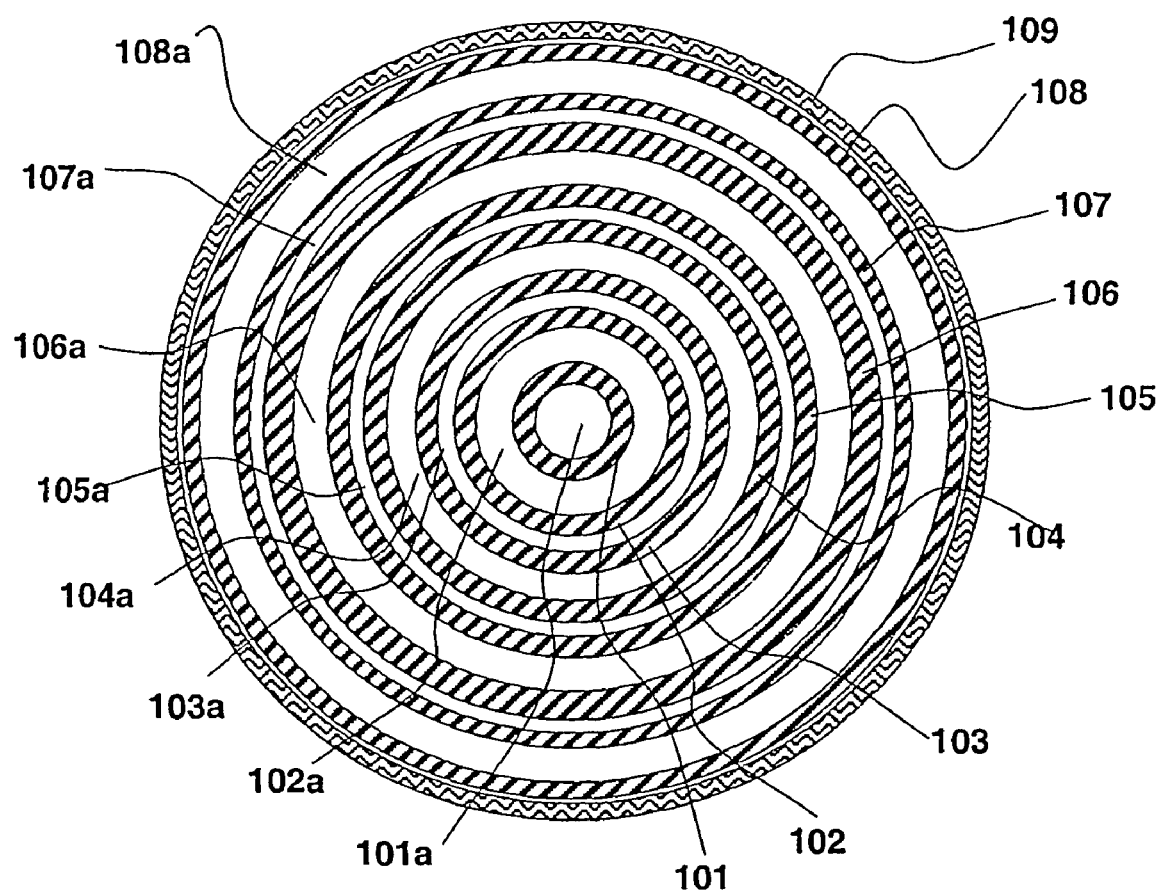
FIG. 5 shows a schematic transversal cross-sectional view of an embodiment of a burner according to the present invention.

Referring to FIG. 5, showing a cross section of the coaxial tubes in a burner according to an embodiment of the invention, reference 101 to 108 being the section of said tubes, 101a to 108a being the channels defined by said tubes and 109 the section of a tube of heat resistant material, designed to confine the flame as above described, the inner tube 101 has typically an inner diameter of from about 6 mm to about 8 mm and a thickness of from about 0.5 mm to about 2 mm.

The other tubes, having preferably a thickness comprised from about 0.5 mm to about 2.5 mm, are then arranged concentrically one to each other to form channels 102a-108a having widths of from about 1 mm to about 3.5 mm, depending on the relative diameter of the tube and flow rate of gas through the aperture.

In particular, the width of each channel is selected according to the amount and kind of gas that is flown through said channel and to the relative radial position of said channel. For instance, in a burner particularly designed for the outer cladding deposition, channels through which inert gas is flown are dimensioned so to obtain an exit velocity of the gas of from about 0.1 and about 2 m/s. Said annular channels may thus have a width of from about 1 mm to about 1.5 mm. On the other side, channels through which combustion gases are flown are dimensioned so to obtain an exit velocity of the gas of from about 2 and about 10 m/s. Said annular channels may thus have a width of from about 2 mm to about 3.5 mm.

According to the preferred embodiment described above with reference to FIGS. 1 to 4, the sections perpendicular to the axis of the coaxial tubes of the distribution chambers have a circular-corona shape, the inner diameter being the diameter of the inner tube defining the annular channel with which the distribution chamber is connected, as described above. The half part of the difference between the outer diameter and the inner diameter of the said circular-corona section will be referred to as "width" of the distribution chamber. The "height" of the distribution chamber is the distance between the two plane surfaces that axially delimitate the distribution chamber, one of them being, according to the embodiment described in FIG. 1 to 3, the surface of the porous material layer that separates the chamber from the entrance to the annular channel in communication therewith. The section of the duct for feeding a gas into the distribution chamber may advantageously be circular. According to a preferred embodiment of the invention, the height of the distribution chambers ranges from half to twice their width; the height and the width of a chamber may suitably have similar values. Preferably, the diameter of the duct for feeding a gas into a distribution chamber is not larger than the height of the chamber; preferably, the width of the chamber is comprised between once and three times the diameter of said duct. The width of a distribution chamber is preferably at least the width of the annular channel in connection therewith chamber; according to a preferred embodiment it is comprised between once and ten times the width of said annular channel, preferably between once and five times. Suitably, all the distribution chambers of a burner have the same values of height and width; the ducts for feeding gases into the distribution chambers may suitably have the same diameters as well.

Generally, through the central channel 101a, a glass precursor material is flown.

The flow of glass precursor material is surrounded by a flame generated by a combusting gas and a combustion sustaining gas flowing through further channels of said burner.

In the present description, the term glass precursor material is intended to refer to any suitable raw material capable of reacting in the presence of a flame to form glass (pure silica) or doped glass particles. Preferably, silicon tetrachloride ($SiCl_4$) can be used. Alternatively, other silicon containing reactants can be used, such as $SiHCl_3$, $SiH_2Cl_2$, $SiH_3Cl$ or $SiH_4$. In addition, chlorine-free silicon containing reactants can be used, such as the siloxane compounds disclosed in U.S. Pat. No. 5,043,002, e.g. octamethylcyclotetrasiloxane, or the organosilicone compounds disclosed in EP A 1,016,635, e.g. hexamethyldisilane.

A preferred glass precursor material capable of forming doped glass particles under the reaction conditions of a flame burner according to the invention is Germanium tetrachloride. Alternative dopant materials are $POCl_3$ or $BBr_3$.

Mixtures of the above glass precursor materials (e.g. $SiCl_4$ and $GeCl_4$) in variable proportion can be used to suitably modify the refractive index of the manufactured preform.

As the above glass precursor materials are generally liquid at ambient temperature, they are preferably heated in advance into a vaporizer, so that high temperature vapours of the glass precursor material are flown through the central tube of the burner. For instance, silicon tetrachloride, having a boiling point of about 57° C. (at 101.330 Pa) is heated at about 100° C. in the vaporizer before being fed into the burner.

It may be advantageous, in particular for relatively large dimension burners (e.g. cladding burners), to add a predetermined amount of a high thermal diffusivity gas to the flow of glass precursor material, in order to increase the heat transfer from the flame towards the inner core of said flow.

The thermal diffusivity of a gas is defined as the ratio of the thermal conductivity to the heat capacity. It measures the ability of a material to conduct thermal energy relative to its ability to store thermal energy. Typical values of thermal diffusivity of gases can be found on a number of reference books, such as R. B. Bird, "Transport Phenomena", Wiley & Sons, New York 1960, or F. P. Incropera, D. P. DeWitt, "Fundamentals of heat and mass Transfer", Wiley and Sons; 3rd edition, New York, 1996.

For the purposes of the present description, a high thermal diffusivity gas is a gas having a thermal diffusivity of at least $3.0 \cdot 10^{-5}$ $m^2/s$ or higher, e.g. up to about $2.0 \cdot 10^{-4}$ $m^2/s$ (values at 400° K.). Examples of suitable high thermal diffusivity gases are oxygen, nitrogen, argon, helium or hydrogen, having a thermal diffusivity at 400° K. of $3.6 \cdot 10^{-5}$ $m^2/s$, $3.7 \cdot 10^{-5}$ $m^2/s$, $3.8 \cdot 10^{-5}$ $m^2/s$, $3.0 \cdot 10^{-4}$ $m^2/s$ and $2.3 \cdot 10^{-4}$ $m^2/s$, respectively.

As the thermal diffusivity of a gas depends, further from its specific thermal diffusivity coefficient, also from the mass fraction of the added gas, it is preferable to use gases with a higher molecular weight, in order to reduce the volume fraction of added gas (or, alternatively, using the same volume fraction of gas, increase its mass fraction). Oxygen is thus preferred for its higher molecular weight and for its relatively high coefficient of thermal diffusivity.

Said high thermal diffusivity gas should preferably be added to the flow of glass precursor material in an amount such that the overall thermal diffusivity of the so obtained mixture is about 50% higher than the thermal diffusivity of the glass precursor material. In particular, when silicon tetrachloride is used, the thermal diffusivity of the mixture should preferably be higher than about $4.0 \cdot 10^{-6}$ $m^2/s$ at 400° K. Preferably, the thermal diffusivity of the mixture is comprised between $4.0 \cdot 10^{-6}$ $m^2/s$ and $5.5 \cdot 10^{-6}$ $m^2/s$ at 400° K.

The high thermal diffusivity gas is preferably admixed in a volume fraction of from about 0.05 to about 0.5 parts with respect to the total volume of the mixture, preferably of from about 0.1 to about 0.4 parts, depending also from the thermal diffusivity of the glass precursor material (e.g. $2.84 \cdot 10^{-6}$ $m^2/s$ at 400° K. for $SiCl_4$). The addition of a high thermal diffusivity gas to a glass precursor material to be fed to a burner for manufacturing an optical fibre preform is described in copending European Patent Application 00127850.6.

According to a method for manufacturing an optical fibre preform, which is a further embodiment of the present invention, a combustible gas and a combustion sustaining gas are flown through at least two of the annular channels defined 102a-108a. Examples of suitable combustible gas are hydrogen or hydrocarbons, such as methane. Oxygen is typically used as the combustion sustaining gas.

If desired, an inert gas may be flown through some of the annular channels 102a-108a, either alone or admixed with the above combustible gas or combustion sustaining gas. For instance, an inert gas may be flown through an annular channel disposed between a first annular channel dedicated to the inlet of a combustible gas and a second annular channel dedicated to the inlet of a combustion sustaining gas. This allows a physical separation of the two flows of combustible gas and of combustion sustaining gas, thus displacing the flame away from the tips of the metal tubes and avoiding possible overheating of the same. Similarly, the flame can be displaced away from the tips of the metal tubes by suitably increasing the inlet speed of the combustible gas and of combustion sustaining gas. Examples of suitable inert gases are argon, helium, nitrogen.

Figure 6:
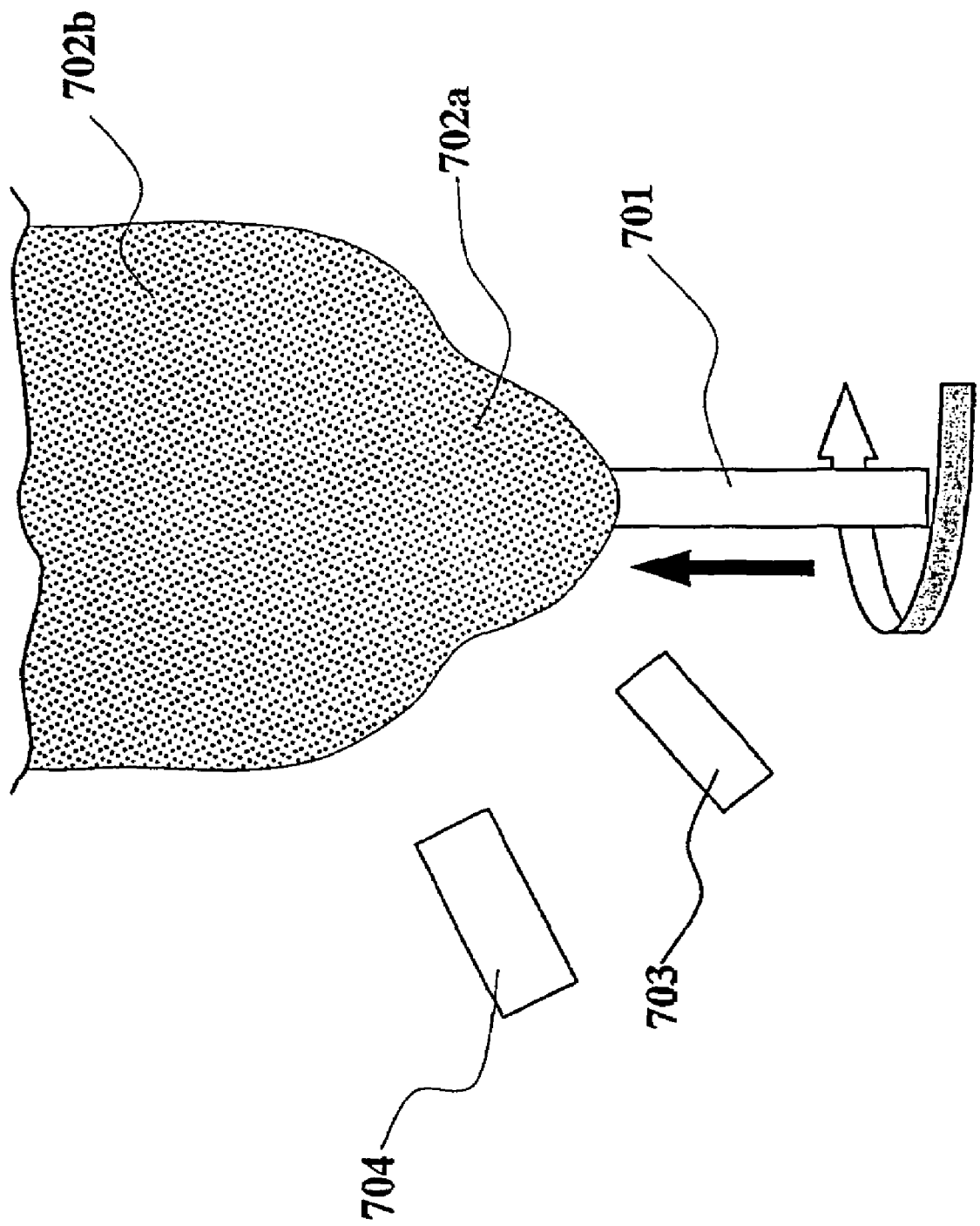
FIG. 6 schematically shows an overcladding deposition step of a method for manufacturing an optical fibre preform according to the present invention.

FIG. 6 schematically illustrates a typical overcladding deposition process, according to the VAD technique, for embodying the method of the present invention. The deposition typically starts onto a glass rod 701 of about 20 mm diameter, comprising the core of the preform and a first portion of the cladding layer, separately manufactured according to conventional techniques. The target preform is rotated about is longitudinal axis and slowly upwardly translated. A lower overcladding burner 703 deposits a first portion of overcladding layer 702a, e.g. up to a diameter of about 90-100 mm onto the preform. An upper burner 704 then completes the deposition by depositing a second overcladding layer 702b, e.g. increasing the diameter of the deposited soot at about 180-200 mm. Typically, the upper burner 704 has increased dimensions with respect to the lower one, in order to allow the deposition of higher amount of silica particles in the time unit.

The so obtained preform is then heated into a furnace and collapsed to obtain a final preform of about 60-80 mm diameter, which is then drawn into an optical fibre according to conventional techniques.

While a burner according to the present invention can advantageously be used in the above process for depositing the overcladding layer of the preform, in particular the outer overcladding portion (i.e. as burner 704), it will be appreciated that such a burner, when suitably dimensioned, can also be used for the deposition of the core and of the inner portion of the cladding.

In a VAD deposition process, it may be advantageous to separate the flame in an inner and an outer flame concentrically disposed. This can be achieved by interposing a tube of heat resistant material between the two flames; said tube may be disposed into the annular housing between two coaxial tubes, said tube of heat resistant material extending for a certain length farther from the tips of the pipes of the inner portion of the burner. The heat resistant material may be suitably chosen among those that can be employed for the tube 109 of FIG. 1, as discussed above.

The use of a tube of heat resistant material is particularly indicated when the coaxial tubes of the burner do not end on the same plane at their extremity outside the burner; this allows both to physically separate the inner flame from the tubes of the outer section, which tubes protrude outside the burner more than the tubes of the inner section of the burner and to confine the inner flame. This protects the tubes of the outer section, which can thus be made of metal. Preferably, the flame separating tube extends for a length such to entirely surround the reaction zone where the glass precursor material reacts to form the glass particles. Particularly for overcladding burners, the flame separating tube should preferably extend for at least about 80 mm from the tips of the pipes of the inner section of the burner. The length of the tube should however preferably not exceed about 150 mm. Preferably, said length is from about 90 to about 130 mm. The use of a flame separating tube as described above in a multi-flame burner for manufacturing an optical fibre preform is described in copending European Patent Application 00127851.4.

It may also be preferred to suitably redistribute the flow of forming glass particles before said flow impacts onto the target preform. To this purpose, a multi-flame burner with a flame separating tube as previously discussed is particularly suitable. In particular, the outlet of the flame separating tube may be suitably modified so to increase the deposition rate of the burner. The modification is such as to confer to the outlet of the quartz separating tube a cross-section having a major and a minor axis. It has been observed that the deposition rate can be increased by increasing the dimensions of the flow of glass particles in a direction substantially perpendicular with respect to the longitudinal axis of the target preform. To achieve this the terminal portion of the flame separating tube should have a section with a minor and a major axis. An elliptical section is particularly suited. In a VAD process for manufacturing an optical fibre preform, the major axis of the section of the terminal portion of the flame separating tube should lay on a plane substantially perpendicular to the longitudinal axis of the growing optical fibre preform. The technique of redistributing flow of forming glass particles as described above in a multi-flame burner for manufacturing an optical fibre preform is described in copending European Patent Application 00127849.8.

EXAMPLE

For this experiment, a burner comprising eight co-axial metal pipes as shown in FIGS. 1 and 5 has been used. The material used for the metal pipes was AISI316L stainless steel. Tubes 101-108 and channels 101a-103a and 105a to 108a of FIG. 5 will be referred to in the present example as tubes 1-8 and channels 1a-7a, respectively. A quartz glass tube has been inserted between the third and the fourth metal tube into channel 104a of FIG. 5 for providing a flame confinement. The following table 1 indicates the relative internal (ID) and outer (OD) diameter of the annular channels determined by the metal tubes; for the innermost channel 1a, having a circular cross section, only the OD has been reported. The inner section of the burner is formed by tubes 1 to 3 (and corresponding channels 1a to 3a), while the outer section of the burner is formed by tubes 4 to 8 (and corresponding channels 4a to 7a)

TABLE 1 dimensions of channels

| | Channel no. | | | | | | |
|---|---|---|---|---|---|---|---|
| | 1a | 2a | 3a | 4a | 5a | 6a | 7a |
| ID (mm) | — | 11 | 21.34 | 37.6 | 44.2 | 55.8 | 61.1 |
| OD (mm) | 7 | 17.6 | 24.4 | 40.2 | 50.5 | 58.3 | 67.55 |

The internal confining quartz glass tube, having a thickness of about 1.5 mm, an inner diameter of 28.4 mm and an outer diameter of 31.4, has been inserted into the annular channel 104a of FIG. 5 (ID 27.4 mm, OD 33.6 mm); said channel was consequently not connected to any feed of gas. The lower portion of the glass tube has been wrapped with a Teflon® tape up to the outer diameter of the clearance, in order to maintain it in a fixed position.

An outer quartz glass tube (ref. 109 of FIGS. 1 and 5) having a thickness of about 2 mm has been further disposed around the outer metal tube 8.

All the metal tubes protruded outside the body of the burner for the same length (201 mm). The outer quartz tube protruded for about 165 mm from the tips of the metal tubes, while the internal quartz tube protruded for about 133 mm from the tips of the metal tubes.

All the distribution chambers had a width of 6 mm and a height of 7.5 mm.

The diameter of all the ducts for feeding gases into the distribution chambers was of 4 mm.

The reactants employed and their relative flow rate and inlet speed are reported in the following table 2, where the innermost opening of the burner is identified with no. 1a. Silica tetrachloride has been supplied by vaporizing the liquid material and feeding it at a temperature of about 80° C. through the central tube, together with oxygen.

TABLE 2

| Reactants and flow rate | | | | | | | |
|---|---|---|---|---|---|---|---|
| | Channel no. | | | | | | |
| | 1a | 2a | 3a | 4a | 5a | 6a | 7a |
| Reactant | $SiCl_4 + O_2$ | $H_2$ | $O_2$ | Ar | $H_2$ | Ar | $O_2$ |
| Flow Rate (slm) | 12 + 7 | 27 | 65 | 14 | 160 | 10 | 115 |
| Inlet velocity (m/s) | 8.2 | 3.4 | 9.9 | 1.5 | 5.7 | 0.7 | 2.9 |

The target preform was a rotating quartz tube of about 90 mm diameter and the burner (i.e. the upper end of the outer glass tube of the burner) has been kept at a distance of about 90 mm from the perform, with an inclination of about 12° with respect to the longitudinal axis of the preform.

The preform was translated upwardly at a speed of 168 mm/h and rotated at about 60 r.p.m.

The deposition was stopped when the preform reached a diameter of about 140-150 mm.

By following the above-described procedure, a regular soot deposition was obtained, without formation of cracks or other defects.

The invention claimed is:

1. A burner for manufacturing an optical fibre preform said burner comprising:
   a plurality of coaxial tubes with a common vertical axis, each two adjacent coaxial tubes defining an annular channel between themselves, wherein there are at least two annular channels;
   a gas distribution chamber at one extremity of each of said annular channels, wherein each distribution chamber is vertically displaced by the other distribution chambers; and
   a plurality of gas-feeding ducts, each gas-feeding duct opening into a corresponding one of said distribution chambers for feeding a gas therein,
   wherein each of said gas-feeding ducts has a longitudinal axis and is positioned such that said longitudinal axis does not intersect said vertical axis and lies on a plane transversal thereto, and
   wherein said gas-feeding ducts are angularly displaced with respect to one another.

2. The burner according to claim 1, wherein said device comprises a feeding duct connected to said distribution chamber, said feeding duct being disposed in a direction such that its outermost portion is substantially tangential with respect to the radially outer surface of the distribution chamber.

3. The burner according to claim 1, wherein a layer of porous material is provided at an inlet section of said annular channel.

4. The burner according to claim 1, wherein the extremities of the tubes in at least one pair of adjacent coaxial tubes lie on distinct planes.

* * * * *

UNITED STATES PATENT AND TRADEMARK OFFICE
CERTIFICATE OF CORRECTION

| | | |
|---|---|---|
| PATENT NO. | : 7,587,914 B2 | Page 1 of 1 |
| APPLICATION NO. | : 10/478835 | |
| DATED | : September 15, 2009 | |
| INVENTOR(S) | : Giacomo Stefano Roba et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 993 days.

Signed and Sealed this
Eleventh Day of June, 2013

Teresa Stanek Rea
*Acting Director of the United States Patent and Trademark Office*